(12) United States Patent
Pourchot et al.

(10) Patent No.: US 10,203,112 B2
(45) Date of Patent: Feb. 12, 2019

(54) OXY BOILER POWER PLANT OXYGEN FEED SYSTEM HEAT INTEGRATION

(71) Applicant: General Electric Technology GmbH, Baden (CH)

(72) Inventors: Thierry Pourchot, Naves Parmelan (FR); Francois Granier, Vetrigne (FR); Frederic Geiger, Giromagny (FR)

(73) Assignee: General Electric Technology GmbH, Baden (CH)

( * ) Notice: Subject to any disclaimer, the term of this patent is extended or adjusted under 35 U.S.C. 154(b) by 43 days.

(21) Appl. No.: 14/707,593

(22) Filed: May 8, 2015

(65) Prior Publication Data
US 2015/0323179 A1    Nov. 12, 2015

(30) Foreign Application Priority Data
May 8, 2014  (EP) .................................. 14290141

(51) Int. Cl.
*F01K 17/06*  (2006.01)
*F01K 17/02*  (2006.01)
(Continued)

(52) U.S. Cl.
CPC ............... *F23L 7/007* (2013.01); *F01K 7/38* (2013.01); *F01K 7/40* (2013.01); *F01K 7/42* (2013.01);
(Continued)

(58) Field of Classification Search
CPC ...... Y02E 20/344; Y02E 20/348; F23L 7/007; F01K 7/40; F01K 7/42; F01K 7/34–7/44;
(Continued)

(56) References Cited

U.S. PATENT DOCUMENTS

| 2,322,102 A | * | 6/1943 | Gschwind | ................. F22D 5/08 |
| | | | | 122/448.2 |
| 2,921,441 A | * | 1/1960 | Buri | .......................... F01K 7/40 |
| | | | | 122/1 C |

(Continued)

FOREIGN PATENT DOCUMENTS

| CN | 101542077 A | 9/2009 |
| CN | 101761915 A | 6/2010 |

(Continued)

OTHER PUBLICATIONS

European Search Report dated Jan. 28, 2015 for European Application No. 14290141.2.

(Continued)

*Primary Examiner* — Mark Laurenzi
*Assistant Examiner* — Xiaoting Hu
(74) *Attorney, Agent, or Firm* — GE Global Patent Operations; Marc A. Vivenzio

(57) ABSTRACT

A coal fired oxy boiler power plant is disclosed in which a steam coil oxygen preheater located on an oxygen line Air Separation Unit is thermally integrated with the condensate system. Thermal energy for the steam coil oxygen preheater is provided via an extraction line connected to a steam extraction port of an intermediate pressure steam turbine. A drain line of the steam coil oxygen preheater fluidly connects the steam coil oxygen preheater to a point of the Rankine steam cycle fluidly within the condensate system.

14 Claims, 2 Drawing Sheets

(51) Int. Cl.

| | | |
|---|---|---|
| *F01K 7/44* | (2006.01) | |
| *F01K 13/00* | (2006.01) | |
| *F22D 1/36* | (2006.01) | |
| *F23L 7/00* | (2006.01) | |
| *F23L 15/04* | (2006.01) | |
| *F01K 9/02* | (2006.01) | |
| *F01K 11/02* | (2006.01) | |
| *F01K 7/42* | (2006.01) | |
| *F01K 7/38* | (2006.01) | |
| *F22D 5/00* | (2006.01) | |
| *F01K 7/40* | (2006.01) | |

(52) U.S. Cl.
CPC ............. *F01K 7/44* (2013.01); *F01K 9/02* (2013.01); *F01K 11/02* (2013.01); *F01K 13/00* (2013.01); *F01K 17/02* (2013.01); *F01K 17/06* (2013.01); *F22D 1/36* (2013.01); *F22D 5/00* (2013.01); *F23L 15/045* (2013.01); *Y02E 20/344* (2013.01); *Y02E 20/348* (2013.01)

(58) Field of Classification Search
CPC . F01K 17/00–17/06; F22D 1/36; F22D 11/02; F22D 11/04; F22D 11/06; F22D 5/00–5/36
See application file for complete search history.

(56) References Cited

U.S. PATENT DOCUMENTS

| | | | | |
|---|---|---|---|---|
| 2,991,620 | A * | 7/1961 | Nekolny | F01K 7/40 60/667 |
| 3,032,999 | A * | 5/1962 | Pierre | F01K 17/06 122/1 C |
| 3,271,960 | A | 9/1966 | Brunner | |
| 3,374,621 | A | 3/1968 | Pacault et al. | |
| 3,423,933 | A | 1/1969 | Knizia | |
| 3,835,650 | A * | 9/1974 | Chesmejef | F01K 7/44 60/670 |
| 4,069,674 | A | 1/1978 | Warren | |
| RE30,589 | E * | 4/1981 | Park | F01K 7/24 290/40 B |
| 4,355,514 | A * | 10/1982 | Reifenberg | F01K 7/24 60/657 |
| 4,516,403 | A * | 5/1985 | Tanaka | F01K 23/065 60/662 |
| 4,729,217 | A | 3/1988 | Kehlhofer | |
| 4,897,999 | A * | 2/1990 | Varney | F23L 15/045 60/670 |
| 4,976,107 | A * | 12/1990 | Korpela | F01K 17/02 110/224 |
| 5,344,627 | A | 9/1994 | Fujii et al. | |
| 5,345,756 | A | 9/1994 | Jahnke et al. | |
| 5,836,162 | A | 11/1998 | Haynes | |
| 7,581,395 | B2 | 9/2009 | Takeuchi et al. | |
| 2002/0023423 | A1 | 2/2002 | Viteri et al. | |
| 2005/0235650 | A1 | 10/2005 | Griffin et al. | |
| 2006/0254251 | A1 | 11/2006 | Yamada | |
| 2008/0302107 | A1 | 12/2008 | Fan et al. | |
| 2009/0178408 | A1 | 7/2009 | Brugerolle et al. | |
| 2010/0007146 | A1 | 1/2010 | Allam et al. | |
| 2010/0071380 | A1 | 3/2010 | Buecker et al. | |
| 2010/0089023 | A1* | 4/2010 | Harada | F01K 23/10 60/39.182 |
| 2010/0132360 | A1 | 6/2010 | Gericke | |
| 2010/0258005 | A1 | 10/2010 | Oishi et al. | |
| 2011/0094228 | A1* | 4/2011 | Fan | F01K 7/22 60/679 |
| 2011/0220744 | A1* | 9/2011 | Zhao | F01K 7/22 241/18 |
| 2011/0277479 | A1 | 11/2011 | Richter et al. | |
| 2011/0290163 | A1 | 12/2011 | Kobayashi | |
| 2012/0111007 | A1* | 5/2012 | Fruh | F01K 17/02 60/648 |
| 2012/0129112 | A1* | 5/2012 | Cegarra Cruz | F01K 17/06 431/11 |
| 2012/0151917 | A1 | 6/2012 | Ungerer et al. | |
| 2012/0216540 | A1* | 8/2012 | Stoever | B01D 53/1475 60/653 |
| 2012/0324893 | A1 | 12/2012 | Hayashi | |
| 2013/0062883 | A1 | 3/2013 | Kaneeda et al. | |
| 2013/0099508 | A1 | 4/2013 | Handagama et al. | |
| 2014/0007576 | A1 | 1/2014 | Alekseev | |
| 2014/0065559 | A1 | 3/2014 | Jukkola | |
| 2015/0323180 | A1 | 11/2015 | Pourchot et al. | |
| 2015/0330628 | A1 | 11/2015 | Pourchot et al. | |
| 2015/0369483 | A1 | 12/2015 | Pourchot et al. | |
| 2016/0033128 | A1* | 2/2016 | Stuxberg | F01K 23/10 60/645 |

FOREIGN PATENT DOCUMENTS

| | | | | |
|---|---|---|---|---|
| CN | 102388265 A | | 3/2012 | |
| CN | 103244944 A | | 8/2013 | |
| DE | 102004059358 A1 | | 6/2005 | |
| DE | 102005026534 A1 | | 12/2006 | |
| DE | 102009014185 A1 | | 9/2010 | |
| DE | 10 2010 044 642 A1 | | 3/2012 | |
| EP | 2584256 A1 | | 4/2013 | |
| EP | 2682569 A1 | | 1/2014 | |
| FR | 1219376 A | * | 5/1960 | ............... F01K 7/40 |
| GB | 915718 A | * | 1/1963 | ......... B01D 19/0063 |
| GB | 1 320 313 A | | 6/1973 | |
| GB | 1510094 A | * | 5/1978 | ............... F01K 7/40 |
| JP | 062806 A | | 1/1994 | |
| RU | 2 335 642 C1 | | 10/2008 | |
| RU | 2 433 339 C2 | | 11/2011 | |
| WO | 2011006862 A2 | | 1/2011 | |

OTHER PUBLICATIONS

Thierry Pourchot et al. "Integration of Oxy Combustion in a Large Size USC PC Plant for a Competitive Solution", Oxyfuel Combustion Conference, Spain, pp. 20, Sep. 12, 2013.

Beer et al., "Measures for Increasing the Net Efficiency of an Existing 300-MW-Block", VGB Kraftwerkslechnik, GMBH, vol. No. 77, Issue No. 05, pp. 358-362, May 1, 1997.

Bouillon et al., "ECO2 : Post-Combustion of Oxyfuel—A Comparison Between Coal Plants with Integrated Co2 Capture" Energy Procedia, vol. No. 01, pp. 4015-4022, 2009.

A European Search Report and Opinion issued in connection with Related EP Application No. 14290138.8 dated Jan. 28, 2015.

A European Search Report and Opinion issued in connection with Related EP Application No. 14290139.6 dated Jan. 28, 2015.

A European Search Report and Opinion issued in connection with Related EP Application No. 14290140.4 dated Jan. 28, 2015.

A U.S. Non-Final Office Action issued in connection with Related U.S. Appl. No. 14/675,305 dated Feb. 17, 2017.

A U.S. Non-Final Office Action issued in connection with Related U.S. Appl. No. 14/682,879 dated Feb. 23, 2017.

A U.S. Non-Final Office Action issued in connection with Related U.S. Appl. No. 14/707,744 dated Mar. 13, 2017.

A U.S. Final Office Action issued in connection with Related U.S. Appl. No. 14/675,305 dated Jul. 6, 2017.

A U.S. Final Office Action issued in connection with Related U.S. Appl. No. 14/682,879 dated Jul. 6, 2017.

Machine translation and a Chinese Office Action issued in connection with corresponding CN Application No. 201510231317.0 dated Jul. 13, 2018.

Decision to Grant issued in connection with corresponding RU Application No. 2015116828 dated Oct. 16, 2018.

* cited by examiner

OXY BOILER POWER PLANT OXYGEN FEED SYSTEM HEAT INTEGRATION

TECHNICAL FIELD

The present disclosure relates generally to heat integration schemes applied to coal fired oxy boiler power plant, and more specifically to the heat integration of oxygen feed systems into such plants.

BACKGROUND INFORMATION

Coal contributes to a large percentage of the electricity generation in the world today and is expected to maintain its dominant share in the foreseeable future. Nonetheless, significant environmental pressures have led to increased environmental demands requiring, not only high efficiency but also reduced emission levels of $CO_2$, $SO_2$, $NO_x$, and mercury to ultra-low levels.

A particular advantageous plant arrangement is the use of an Oxy-combustion steam plant with $CO_2$ capture. Oxy-combustion systems use oxygen, usually produced in an air separation unit, instead of air, for the combustion of the primary fuel. The oxygen is often mixed with an inert gas, such as recirculated flue gas, in order to keep the combustion temperature at a suitable level. In addition, it may be preferable to separately or additionally preheat oxygen from the Air Separation Unit in a steam coil oxygen preheater.

Oxy-combustion processes produce flue gas having $CO_2$, water and $O_2$ as its main constituents, the $CO_2$ concentration being typically greater than about 70% by volume. Therefore, $CO_2$ capture from the flue gas of an oxy-combustion process can be done relatively simply in a Gas Processing Unit.

An example of a typical water steam cycle of a high efficiency oxy-combustion steam plants is shown in FIG. 1. The plant comprises a triple-pressure series of reheat steam turbines HP, IP, LP fed by steam from a boiler 142. Exhaust steam from the last low pressure steam turbine LP is condensed in a condenser 102 before being polished 104 and pumped via a condensate pump 103 successively through a series of low pressure heater 106,107,108,109,131, a feed water tank 136 and high pressure heaters 132 before returning to the boiler 142 in a closed loop. The heat source for the low and high pressure heaters is typically steam extracted from the low/intermediate and high pressure steam turbines.

Due to the large benefit in ensuring the highest efficiency cycle there is a continuing need to find ways of better integrating the thermal needs and sinks of the oxy-combustion capture systems within the steam power plant. This requires an optimization of the heat needs and sinks of the capture system with the plant cycle to ensure no energy is wasted. In particular, this needs consideration of how to integrate the steam coil oxygen preheater into the thermal cycle.

SUMMARY

A coal fired Oxy boiler with post combustion flue gas $CO_2$ capture system and a steam cycle power plant scheme is provided that integrates major heat generation sources of the systems in order to provide flexible plant operation and improved overall plant thermal efficiency.

The disclosure is based on the general idea of a novel scheme for thermally incorporating an Air Separation Unit into the condensate system of a coal fired oxy boiler power plant.

An aspect provides a coal fired Oxy boiler power plant comprising a Rankine steam cycle having a high pressure steam turbine, adapted to expand steam, having an exit, an intermediate pressure steam turbine adapted to expand steam from the high pressure steam turbine, and a low pressure steam turbine adapted to expand steam from the intermediate pressure steam turbine having a steam extraction port. A condensate system of the cycle further comprises a condenser adapted to condense steam exhausted from the low pressure steam turbine, a series of low pressure heaters adapted to receive and serially heat condensate from the condenser, a feed water tank configured and arranged to receive condensate from the series of low pressure heaters, and a series of high pressure heaters adapted to receive condensate from the feed water tank.

The oxy boiler power plant further comprises an Air Separation Unit having an oxygen line with a steam coil oxygen preheater wherein an extraction line connects the steam extraction port to the steam coil oxygen preheater. A drain line then fluidly connects the steam coil preheater to a point of the Rankine steam cycle fluidly between the series of low pressure preheater and feed water tank.

In an aspect the intermediate pressure steam turbine is a multi-stage intermediate pressure steam turbine and the steam extraction port is configured and arranged to extract steam from an intermediate stage of the intermediate pressure steam turbine.

In an aspect an emergency line is connected to the drain line and the condenser.

It is a further object of the invention to overcome or at least ameliorate the disadvantages and shortcomings of the prior art or provide a useful alternative.

Other aspects and advantages of the present disclosure will become apparent from the following description, taken in connection with the accompanying drawings which by way of example illustrate exemplary embodiments of the present invention

BRIEF DESCRIPTION OF THE DRAWINGS

By way of example, an embodiment of the present disclosure is described more fully hereinafter with reference to the accompanying drawings, in which.

DETAILED DESCRIPTION

Figure 1:
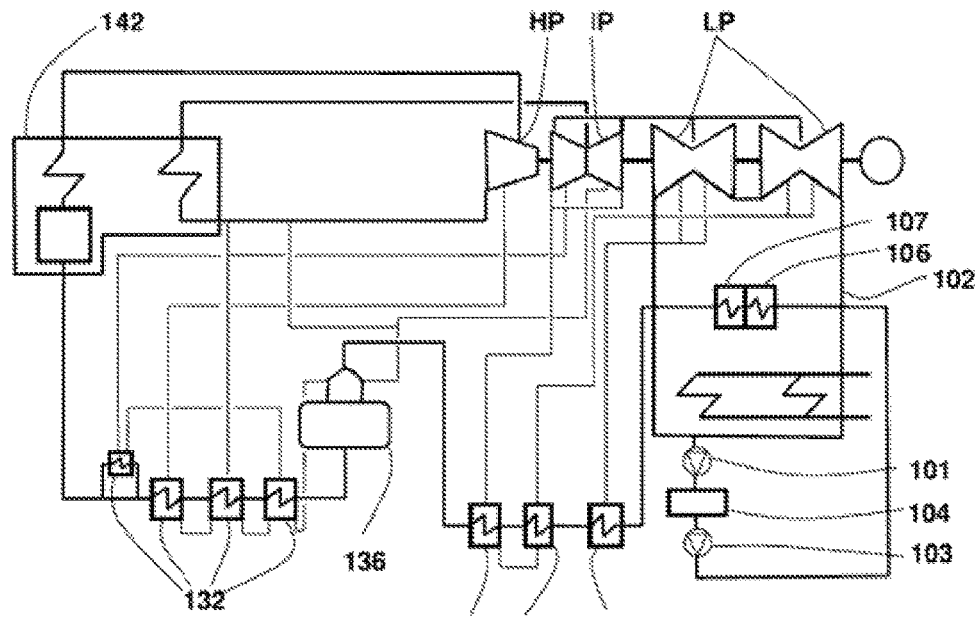
FIG. 1 is a schematic of a coal fired oxy boiler power plant of the prior art to which exemplary embodiments may be applied.

Exemplary embodiments of the present disclosure are now described with references to the drawings, wherein like reference numerals are used to refer to like elements throughout. In the following description, for purposes of explanation, numerous specific details are set forth to provide a thorough understanding of the disclosure. However, the present disclosure may be practiced without these specific details, and is not limited to the exemplary embodiment disclosed herein.

Throughout this specification reference is made to serial units. In this context serial means arranged in a series starting from an upstream end as defined by the nominal flow of working fluid through the unit during it's normal operation.

Figure 2:
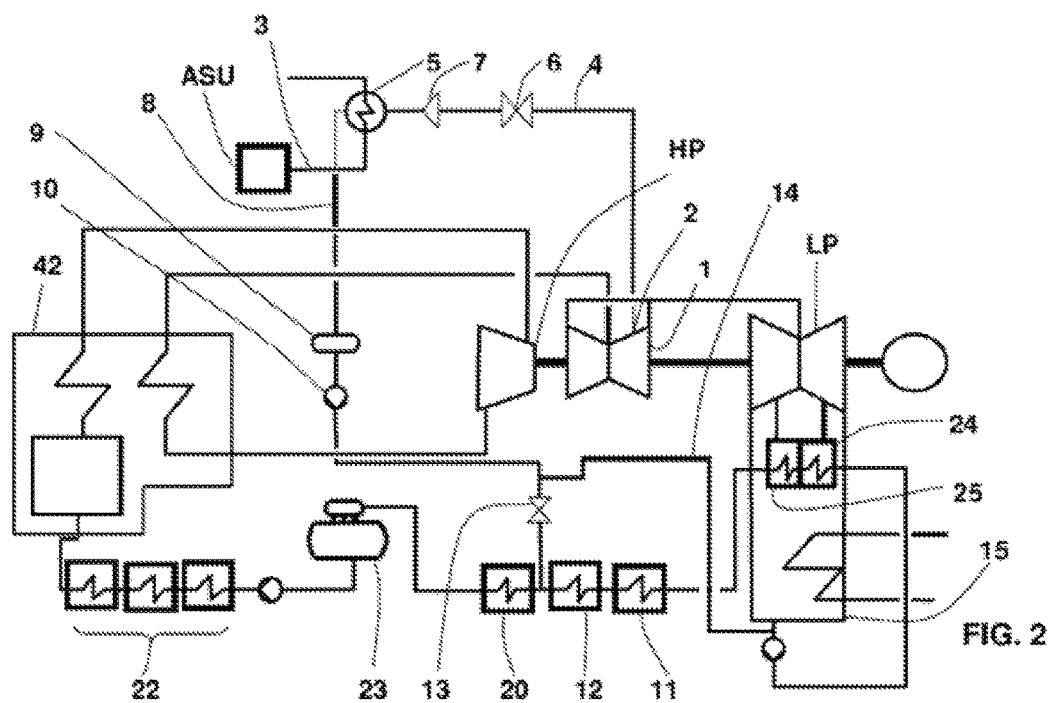
FIG. 2 is a schematic of the heat integration of an Air Separation Unit steam coil oxygen pre-heater into a coal fired oxy boiler power plant.

An exemplary embodiment shown in FIG. 2, which may be applied to a coal fired oxy boiler power plant shown in FIG. 1, provides a steam extraction arrangement and condensate return scheme for heat supply to an oxygen feed line 3 emanating from an Air Separation Unit. As shown in FIG. 2 the coal fired oxy boiler power plant comprises a Rankine steam cycle having a high pressure steam turbine HP adapted to expand steam, an intermediate pressure steam turbine 1 adapted to expand steam from the high pressure steam turbine HP and a low pressure steam turbine LP adapted to expand steam from the intermediate pressure steam turbine 1 having a steam extraction port 2. A condenser 15 connected to the low pressure steam turbine LP exhaust condenses exhausted steam as a first element of a condensate system. From the condenser 15 condensate serially passes through a series of low pressure heaters 24, 25, 11, 12, 20 where the condensate is successively heated. From the low pressure heaters 24, 25, 11, 12, 20 condensate flow in a feed water tank 23 which forms the next element of the condensate system. Condensate from the feed water tank 23 is directed into the last element of the condensate system, a series of High Pressure heaters 22.

The oxy boiler power plant further comprises an Air Separation Unit and a steam coil oxygen preheater 5 downstream of the Air Separation Unit for preheating oxygen produced in the Air Separation Unit. An extraction line 4 connects the steam extraction port 2 to the steam coil oxygen preheater 5. A drain line 8 then fluidly connects the steam coil oxygen preheater 5 to the condensate system.

In an exemplary embodiment shown in FIG. 2 steam is extracted from an IP steam turbine 1, preferably from an extraction port 2 taken from an intermediate stage of a multi stage IP steam turbine, which is typically used as a heat source for at least one of a serial of Low Pressure Heaters 11, 12, 20 or the Feed water Tank 23. In an exemplary embodiment shown in FIG. 2, the extraction steam is routed via an extraction line 4 to a steam coil oxygen preheater 5 of the Air Separation Unit oxygen feed line 3. The steam pressure is controlled, typically to around 10 bar by means of an extraction control valve 6 located in the extraction line. Depending of the temperature of the extraction steam a de-superheater 7 may additional be located in the extraction line 4 upstream of steam coil oxygen preheater 5 to ensure oxygen is heated to about 140° C. so as to improve the global heat rates and avoid condensation risk at injection ports of the flue gas or burner.

Figure 3:
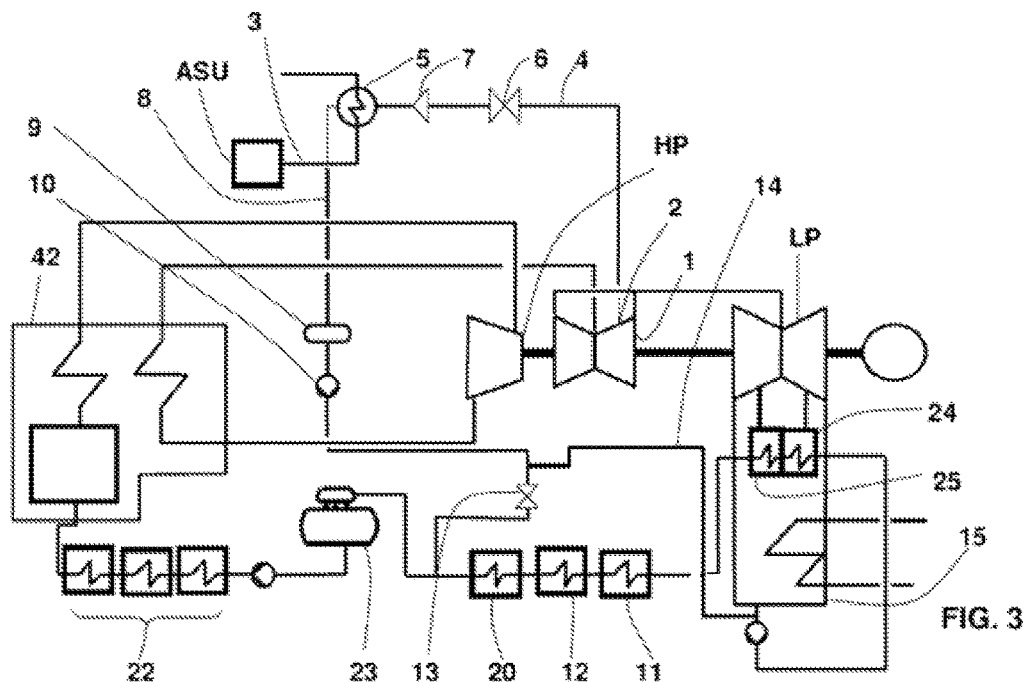
FIG. 3 is a schematic of the heat integration system of FIG. 2 in which an alternate drain line routing into the condensate system is shown.
Figure 4:
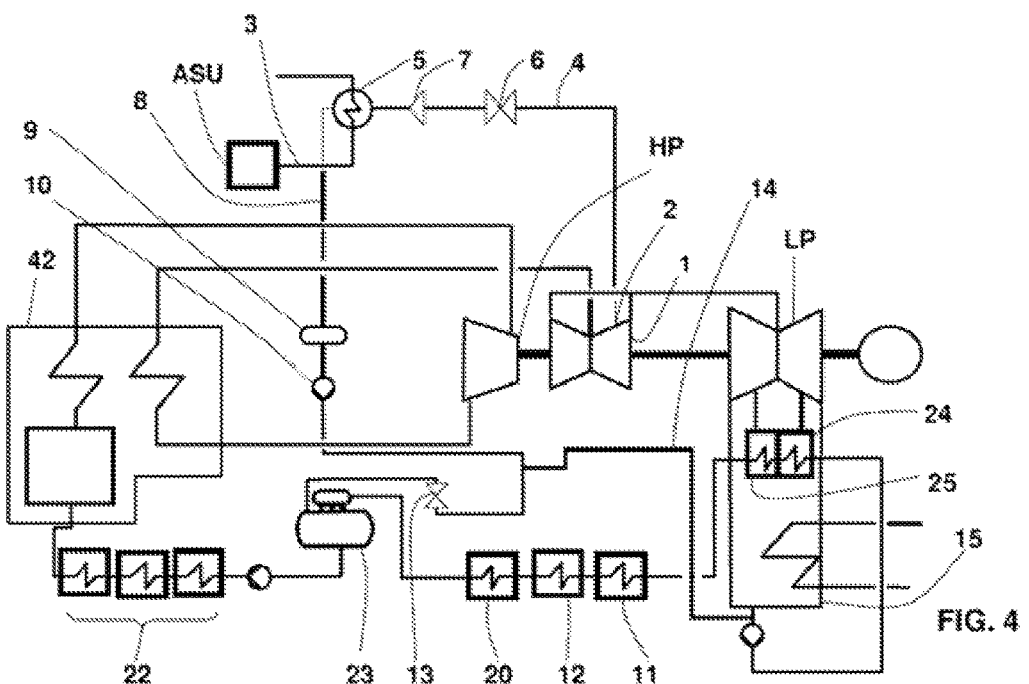
FIG. 4 is a schematic of another the heat integration system of FIG. 2 in which a further alternate drain line routing into the condensate system is shown.

From the steam coil oxygen preheater 5 the drain line 8 directs condensate formed in the steam coil oxygen preheater 5 to a condensate tank 9 from where it is pumped by condensate pump 10 back into the condensate system wherein a drain control valve 13 provides level control of the condensate tank 9. In an exemplary embodiment shown in FIG. 2 the condensate is pumped back to the condensate system between the fourth serial LP heater 12 and the fifth serial LP heater 20. In an exemplary embodiment shown in FIG. 3, condensate is pumped back to the condensate system at a point between the fifth LP serial heater 11 and the feed water tank 23. In an exemplary embodiment shown in FIG. 4 condensate is pumped back to the feed water tank 23.

In an exemplary embodiment shown in FIG. 2, an emergency line 14 connects the drain line 8 downstream of the condenser 15. This line is normally closed.

Although the disclosure has been herein shown and described in what is conceived to be the most practical exemplary embodiment, it will be appreciated by those skilled in the art that the present disclosure can be embodied in other specific forms without departing from the spirit or essential characteristics thereof. The presently disclosed embodiments are therefore considered in all respects to be illustrative and not restricted. The scope of the disclosure is indicated by the appended claims rather that the foregoing description and all changes that come within the meaning and range and equivalences thereof are intended to be embraced therein.

REFERENCE NUMBERS

1 IP Turbine
2 Extraction port
3 Oxygen feed line
4 extraction line
5 steam coil oxygen preheater
6 control valve
7 de-superheater
8 drain line
9 condensate tank
10 condensate pump
11 Low Pressure Heater #3
12 Low Pressure Heater #4
13 drain control valve
14 emergency line
15 condenser
20 Low Pressure heater #5
22 Serial High Pressure heaters
23 Feed Water Tank
24 Low Pressure Heater #1
25 Low Pressure Heater #2
42 Boiler
101 Condenser Extraction pump first stage
102 Condenser
103 pump
104 Condensate Polishing plant
106 Serial Low Pressure heater #1
107 Serial Low Pressure heater #2
108 Serial Low Pressure heater #3
109 Serial Low Pressure heater #4
131 Serial Low Pressure heater #5
132 Serial High Pressure heater
136 Feed water tank
142 Boiler
HP High Pressure steam turbine
IP Intermediate pressure steam turbine
LP Low pressure steam turbine
ASU Air Separation Unit

What is claimed is:
1. A coal fired oxy boiler power plant comprising:
a steam cycle including:
a high pressure steam turbine HP configured to expand steam;
an intermediate pressure steam turbine, configured to expand steam from the high pressure steam turbine HP, having a steam extraction port; and
a low pressure steam turbine LP configured to expand steam from the intermediate pressure steam turbine; and
a condensate system including:
a condenser configured to condense steam exhausted from the low pressure steam turbine LP;

a plurality of serial low pressure heaters, arranged and ordered in sequential order based on a condensate flow direction, configured to receive and serially heat condensate from the condenser; and a feed water tank configured and arranged to receive condensate from the series of low pressure heaters;

the oxy boiler power plant further comprising: an oxygen feed line with a steam coil oxygen preheater; an extraction line connecting the steam extraction port to the steam coil oxygen preheater; a drain line fluidly connecting the steam coil oxygen preheater to the condensate system, the drain line having a condensate tank, a drain control valve, and a condensate pump between the condensate tank and the drain control valve; and an emergency line connecting, the drain line to a downstream of the condenser, the emergency, line configured to be normally closed, wherein the drain line directs condensate formed in the steam coil oxygen preheater to the condensate tank from where the condensate pump pumps the condensate through the drain control valve and back into the condensate system, and the drain control valve provides level control of the condensate tank.

2. The coal fired oxy boiler power plant of claim 1 wherein the drain line connects to the condensate system at a location between a fifth of the serial low pressure heaters and the feed water tank.

3. The coal fired Oxy boiler power plant of claim 1 wherein the drain line connects to the condensate system at the feed water tank.

4. The coal fired oxy boiler power plant of claim 1 wherein the drain line is connected to a location in the condensate system between a fourth of the serial low pressure heaters and a fifth of the serial low pressure heaters.

5. The coal fired Oxy boiler power plant of claim 1 further comprising:
an extraction control valve located in the extraction line.

6. The coal fired Oxy boiler power plant of claim 5 further comprising:
a desuperheater, in the extraction line, configured to remove superheat from steam in the extraction line.

7. The coal fired Oxy boiler power plant of claim 6 wherein the intermediate pressure steam turbine is a multi-stage intermediate pressure steam turbine and the steam extraction port is configured and arranged to extract steam from an intermediate stage of the intermediate pressure steam turbine.

8. The coal fired Oxy boiler power plant of claim 1 further comprising:
a desuperheater, in the extraction line, configured to remove superheat from steam in the extraction line.

9. The coal fired Oxy boiler power plant of claim 1 wherein the intermediate pressure steam turbine is a multi-stage intermediate pressure steam turbine and the steam extraction port is configured and arranged to extract steam from an intermediate stage of the intermediate pressure steam turbine.

10. The coal fired oxy boiler power plant of claim 1 wherein a conduit of the drain line directly connects the condensate pump to the condensate tank and another conduit of the drain line directly connects the condensate pump to the drain control valve.

11. The coal fired Oxy boiler power plant of claim 1 further comprising:
a desuperheater in the extraction line upstream of the steam coil oxygen preheater to ensure oxygen is heated to about 140° C.

12. The coal fired Oxy boiler power plant of claim 1 wherein the drain control valve is positioned between the condensate pump and the feed water tank.

13. The coal fired Oxy boiler power plant of claim 12 wherein the condensate pump pumps condensate through the drain control valve to the feed water tank via a direct conduit connection between the feed water tank and the drain control valve.

14. A coal fired oxy boiler power plant comprising:
a steam cycle including:
a high pressure steam turbine HP configured to expand steam;
an intermediate pressure steam turbine, configured to expand steam from the high pressure steam turbine HP, having, a steam extraction port;
a low pressure steam turbine LP configured to expand steam from the intermediate pressure steam turbine; and
a condensate system including:
a condenser configured to condense steam exhausted from the low pressure steam turbine LP;
a plurality of serial low pressure heaters, arranged and ordered in sequential order based on a condensate flow direction, configured to receive and serially heat condensate from the condenser; and
a feed water tank configured and arranged to receive condensate from the series of low pressure heaters,
the oxy boiler power plant further comprising:
an oxygen feed line with a steam coil oxygen preheater; an extraction line connecting the steam extraction port to the steam coil oxygen preheater; a desuperheater in the extraction line removes superheat from steam in the extraction line; a drain line fluidly connecting the steam coil oxygen preheater to the condensate system, the drain line having a condensate tank, a drain control valve, and a condensate pump between the condensate tank and the drain control valve; and an emergency line connecting the drain line to a downstream of the condenser, the emergency line configured to be normally closed, wherein the intermediate pressure steam turbine is a multi-stage intermediate pressure steam turbine, the steam extraction port extracts steam from an intermediate stage of the intermediate pressure steam turbine, and the drain line directs condensate formed in the steam coil oxygen preheater to the condensate tank from where the condensate pump pumps the condensate through the drain control valve and back into the condensate system, and the drain control valve provides level control of the condensate tank.

* * * * *